(12) United States Patent
Takahashi

(10) Patent No.: US 11,592,705 B2
(45) Date of Patent: Feb. 28, 2023

(54) LIQUID CRYSTAL DISPLAY DEVICE, ELECTRONIC APPARATUS, DISPLAY CONTROL METHOD, DISPLAY CONTROL PROGRAM, AND NON-TRANSITORY RECORDING MEDIUM

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/878,038

(22) Filed: May 19, 2020

(65) Prior Publication Data
US 2020/0310194 A1 Oct. 1, 2020

Related U.S. Application Data

(63) Continuation of application No. 16/440,804, filed on Jun. 13, 2019, now Pat. No. 10,761,368, which is a (Continued)

(30) Foreign Application Priority Data

Jan. 27, 2017 (JP) .............................. JP2017-013510

(51) Int. Cl.
*G02F 1/13357* (2006.01)
*G02F 1/1335* (2006.01)
(Continued)

(52) U.S. Cl.
CPC ........ *G02F 1/133603* (2013.01); *G02F 1/133* (2013.01); *G02F 1/1335* (2013.01);
(Continued)

(58) Field of Classification Search
CPC .. G02F 1/133603; G02F 1/133; G02F 1/1335; G02F 1/133512; G02F 1/133528; G09G 3/20; G09G 3/34; G09G 3/36
(Continued)

(56) References Cited

U.S. PATENT DOCUMENTS 6,008,871 A 12/1999 Okumura
2005/0259441 A1 11/2005 Arai et al.
(Continued)

FOREIGN PATENT DOCUMENTS

CN 1851539 A 10/2006
JP 63-43123 A 2/1988
(Continued)

OTHER PUBLICATIONS

International Preliminary Report on Patentability and English translation of the Written Opinion of the International Searching Authority (Forms PCT/IB/326, PCT/IB/373, and PCT/ISA/237) dated Aug. 8, 2019, for International Application No. PCT/JP2017/046850, with English translation.
(Continued)

*Primary Examiner* — Charles S Chang
(74) *Attorney, Agent, or Firm* — Birch, Stewart, Kolasch & Birch, LLP

(57) ABSTRACT

An electronic apparatus using a liquid crystal display device, a display control method used in the liquid crystal display device, and a non-transitory recording medium for storing a display control program, sets a region having a larger area of an information display region and a background region as a transmission region and a region having a smaller area as a shielding region. A tint change of the shielding region caused by a TN type liquid crystal and a light source for backlight is reduced, and thus, it is possible to make the tint change depending on the viewing direction unremarkable.

21 Claims, 15 Drawing Sheets

Related U.S. Application Data continuation of application No. PCT/JP2017/046850, filed on Dec. 27, 2017.

(51) Int. Cl.
- *G02F 1/133* (2006.01)
- *G09G 3/20* (2006.01)
- *G09G 3/36* (2006.01)
- *G09G 3/34* (2006.01)

(52) U.S. Cl.
CPC .. *G02F 1/133512* (2013.01); *G02F 1/133528* (2013.01); *G09G 3/20* (2013.01); *G09G 3/34* (2013.01); *G09G 3/36* (2013.01)

(58) Field of Classification Search
USPC .......................................................... 349/85
See application file for complete search history.

(56) References Cited

U.S. PATENT DOCUMENTS

| | | |
|---|---|---|
| 2006/0055657 A1 | 3/2006 | Koyama et al. |
| 2007/0058108 A1 | 3/2007 | Uehara et al. |
| 2007/0252798 A1 | 11/2007 | Wu |
| 2008/0284719 A1* | 11/2008 | Yoshida .............. G02F 1/13392 345/102 |
| 2009/0135207 A1 | 5/2009 | Tseng et al. |
| 2010/0085361 A1 | 4/2010 | Kim et al. |
| 2010/0156955 A1* | 6/2010 | Kimura .................... G09G 3/36 348/448 |
| 2012/0194763 A1* | 8/2012 | Cheong ............. G02F 1/133555 349/62 |
| 2017/0004798 A1 | 1/2017 | Park et al. |
| 2019/0294000 A1 | 9/2019 | Takahashi |

FOREIGN PATENT DOCUMENTS

| | | |
|---|---|---|
| JP | 10-260403 A | 9/1998 |
| JP | 2000-356768 A | 12/2000 |
| JP | 2001-312252 A | 11/2001 |
| JP | 2003-66926 A | 3/2003 |
| JP | 2003-222833 A | 8/2003 |
| JP | 2004-53694 A | 2/2004 |
| JP | 2005-10820 A | 1/2005 |
| JP | 2005-332681 A | 12/2005 |
| JP | 2006-53206 A | 2/2006 |
| JP | 2006-201246 A | 8/2006 |
| JP | 2007-11049 A | 1/2007 |
| JP | 2007-79093 A | 3/2007 |
| JP | 2008-116704 A | 5/2008 |
| JP | 2010-2445 A | 1/2010 |
| JP | 2019-181438 A | 10/2019 |
| WO | WO 2018/139159 A1 | 8/2018 |

OTHER PUBLICATIONS

International Search Report (Form PCT/ISA/210) dated Apr. 3, 2018, for International Application No. PCT/JP2017/046850, with English translation.

U.S. Office Action for U.S. Appl. No. 16/440,804, dated Apr. 8, 2020 (Notice of Allowance).

Japanese Office Action for corresponding Japanese Application No. 2019-181438, dated Dec. 23, 2020, with English translation.

Japanese Office Action for corresponding Japanese Application No. 2021-148505, dated Jun. 24, 2022, with English translation.

* cited by examiner

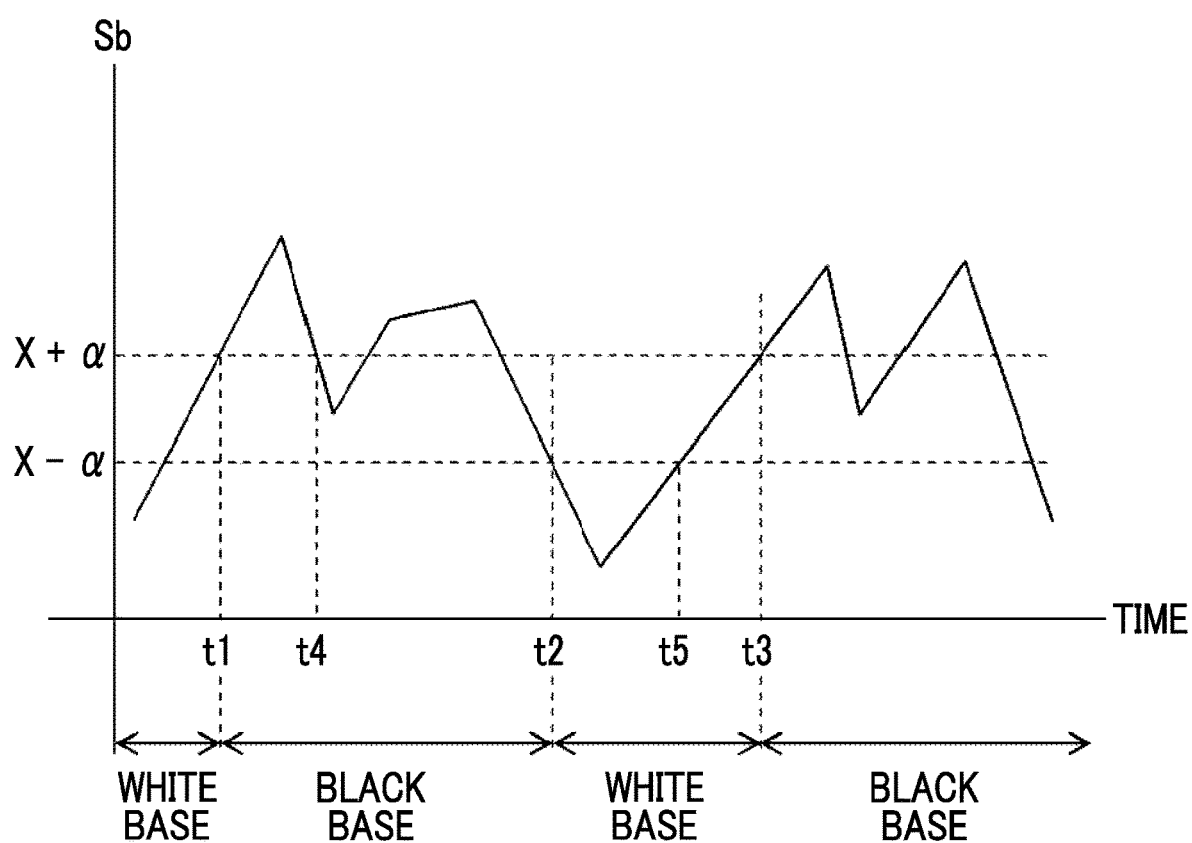

FIG. 18A
FIG. 18B
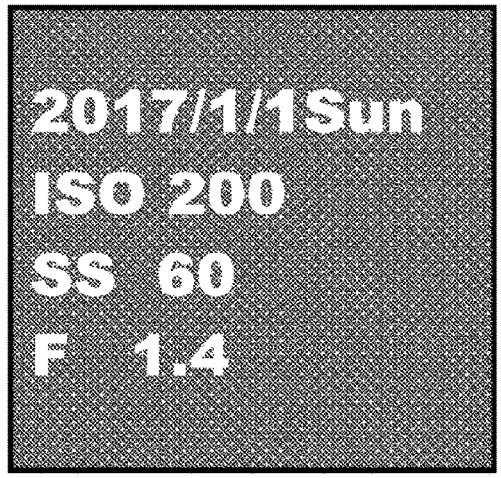
FIG. 19A
FIG. 19B
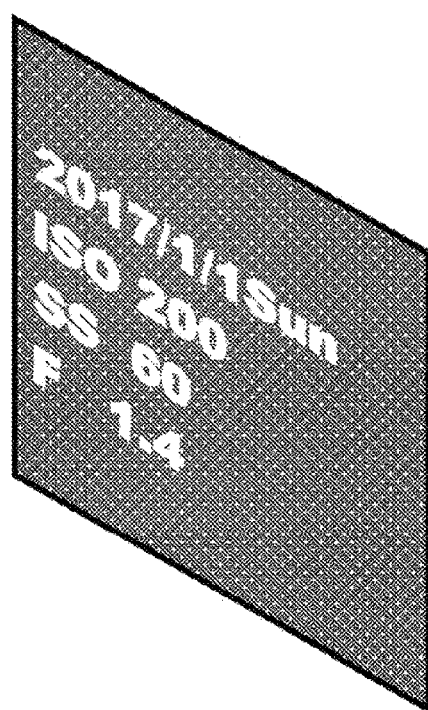
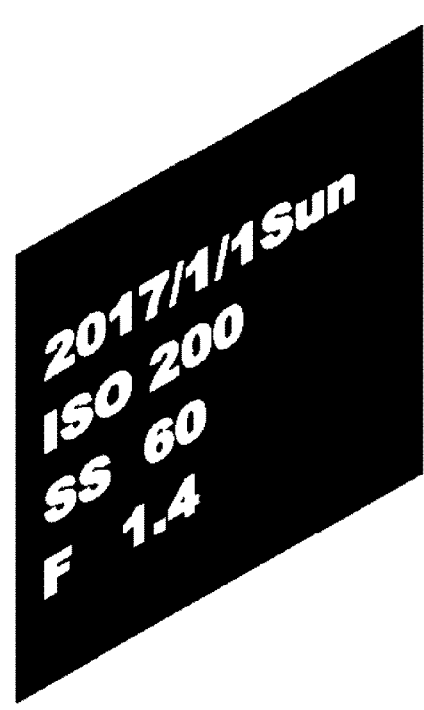

LIQUID CRYSTAL DISPLAY DEVICE, ELECTRONIC APPARATUS, DISPLAY CONTROL METHOD, DISPLAY CONTROL PROGRAM, AND NON-TRANSITORY RECORDING MEDIUM

CROSS-REFERENCE TO RELATED APPLICATIONS

This application is a Continuation of U.S. patent application Ser. No. 16/440,804, filed Jun. 13, 2019, which is a Continuation of PCT International Application No. PCT/JP2017/046850 filed on Dec. 27, 2017, which claims priority under 35 U.S.C. § 119(a) to Japanese Patent Application No. 2017-013510 filed on Jan. 27, 2017. Each of the above application(s) is hereby expressly incorporated by reference, in its entirety, into the present application.

BACKGROUND OF THE INVENTION

1. Field of the Invention

The present invention relates to a liquid crystal display device, an electronic apparatus, a display control method, and a non-transitory computer-readable recording medium for storing a display control program, and particularly to a technology for improving visibility of liquid crystal display using a TN type liquid crystal display panel (TN: Twisted Nematic) and a light source for backlight.

2. Description of the Related Art

In a liquid crystal display device, since visibility is changed depending on a configuration of a display device and a condition during observation, various measures are prepared. For example, JP2007-079093A describes a technology for suppressing a change of tint during the switching between illumination angles by switching between a wavelength ranges of light-emitting diodes (LED) to be turned on depending on an angle of view in a light source device which switches between illumination angle ranges and changing a state of an element which switches between a transparent state and a scattering state. JP2003-222833A describes a technology for obtaining favorable-visibility display by using an optical member such as a phase difference plate or a polarization separation element in an STN type (STN: Super Twisted Nematic) liquid crystal display device that performs positive display by using reflection light and performs negative display by using transmission light from a backlight unit. JP2007-011049A describes a technology for suppressing a decrease in contrast by using a λ/4 plate in a semi-transmission type liquid crystal display device capable of performing negative display and positive display by using a backlight unit. JP2003-222833A and JP2007-011049A describe that the "positive display means that white display is performed during non-application and the negative display means that black display is performed during voltage application.

SUMMARY OF THE INVENTION

In a case where backlight is illuminated in a display device using transmission type liquid crystals or semi-transmissive liquid crystals, since transmission wavelength characteristics of the backlight are different depending on an angle (viewing direction), the color of liquid crystal display seems to be changed depending on the angle (tint change). In particular, since the transmission wavelength characteristics of the shielding region (black region) greatly depend on the angle, in a case where the angle is changed, the color seems to be greatly changed. The problem of such a tint change is remarkable in a TN type (TN: Twisted Nematic) liquid crystal display device which is widely used since the TN type liquid crystal display device is able to be driven at a low voltage and is inexpensive. Hereinafter, a tint change of the TN type liquid crystal display device according to the related art will be described.

FIG. 18A shows a state in which a liquid crystal display panel (it is assumed that the TN type liquid crystal is used) during non-illumination of backlight is viewed from the front. Information (date, ISO: ISO sensitivity, SS: shutter speed, F: F number) is displayed as white (transmission region), and the background is displayed as black (shielding region). Meanwhile, FIG. 18B shows a state in which the same liquid crystal display panel is viewed from the front during the illumination of the backlight. In a background portion which is the shielding region, the tint also seems to be changed (depending on the wavelength range of the backlight, but the tint seems to be in, for example, bluish color) due to the influence of the backlight. As shown in FIG. 19A and FIG. 19B, in a case where the liquid crystal display panel of FIG. 18B is viewed in a diagonal direction during the illumination of the backlight (FIG. 19A is viewed in a lower left direction and FIG. 19B is viewed in a lower right direction), the tint is hardly changed in a character portion which is the transmission region of the backlight. However, since the angle of view of the TN type liquid crystal is extremely narrow, the tint of the background region seems to be greatly changed even though the viewing direction is changed a little.

In this regard to the problem of the tint change, since multiple kinds of light sources (a white LED and a blue LED) are used depending on the angle of view and the control of a switching element is further controlled in the technology described in JP2007-079093A, the device configuration and control are complicated. In the technologies described in JP2003-222833A and JP2007-011049A, the configuration is complicated due to the use of the optical member such as the phase difference plate or the polarization separation element, and a method of coping with the tint change depending on the viewing direction is not described.

As stated above, in the related art, it is difficult to make the tint change depending on the viewing direction unremarkable in the liquid crystal display device.

The present invention has been made in view of such circumstances, and an object of the present invention is to provide a liquid crystal display device which makes a tint change depending on a viewing direction unremarkable by using a TN type liquid crystal and a light source for backlight, and a display control method of the liquid crystal display device. Another object of the present invention is to provide a non-transitory computer-readable recording medium for storing a display control program causing the liquid crystal display device to perform the display control method In order to achieve the aforementioned objects, a liquid crystal display device according to a first aspect of the present invention comprises: a light source of a backlight that includes light rays of two or more wavelengths; a liquid crystal display panel configured to have a shielding region which shields the backlight and an external incidence ray and a transmission region which transmits the backlight using a Twisted Nematic type liquid crystal; and a processor configured to acquire a first mode or a second mode as a mode of the liquid crystal display panel; and display information having an information display region and a background region on the liquid crystal display panel, wherein the processor further configured to perform first display control in which a region having a larger area of the information display region and the background region is set as the shielding region and a region having a smaller area is set as the transmission region in the first mode; and perform second display control in which the region having the larger area of the information display region and the background region is set as the transmission region and the region having the smaller area is set as the shielding region in the second mode.

In order to achieve the aforementioned objects, a display control method according to a seventh aspect of the present invention is a display control method of a liquid crystal display device including a light source of a backlight that includes light rays of two or more wavelengths, and a liquid crystal display panel configured to have a shielding region which shields the backlight and an external incidence ray and a transmission region which transmits the backlight and the external incidence ray using a Twisted Nematic type liquid crystal, the method comprising: acquiring a first mode or a second mode as a mode of the liquid crystal display panel; and displaying information having an information display region and a background region on the liquid crystal display panel based on the acquired mode; wherein the method further comprising: performing first display control in which a region having a larger area of the information display region and the background region is set as the shielding region and a region having a smaller area is set as the transmission region in the first mode; and performing second display control in which the region having the larger area of the information display region and the background region is set as the transmission region and the region having the smaller area is set as the shielding region in the second mode.

As described above, according to a liquid crystal display device, an electronic apparatus, a display control method, and a non-transitory computer-readable recording medium for storing a display control program according to the present invention, it is possible to make a tint change depending on a viewing direction unremarkable.

BRIEF DESCRIPTION OF THE DRAWINGS

FIG. 17 is another diagram for describing the display control with consideration for the hysteresis.

FIG. 18A and FIG. 18B are diagrams for describing display control according to the related art.

FIG. 19A and FIG. 19B are other diagrams for describing display control according to the related art.

DESCRIPTION OF THE PREFERRED EMBODIMENTS

Hereinafter, embodiments of a liquid crystal display device, an electronic apparatus, a display control method, a display control program, and a non-transitory recording medium according to the present invention will be described in detail.

First Embodiment

<Configuration of Imaging Apparatus>

Figure 1:
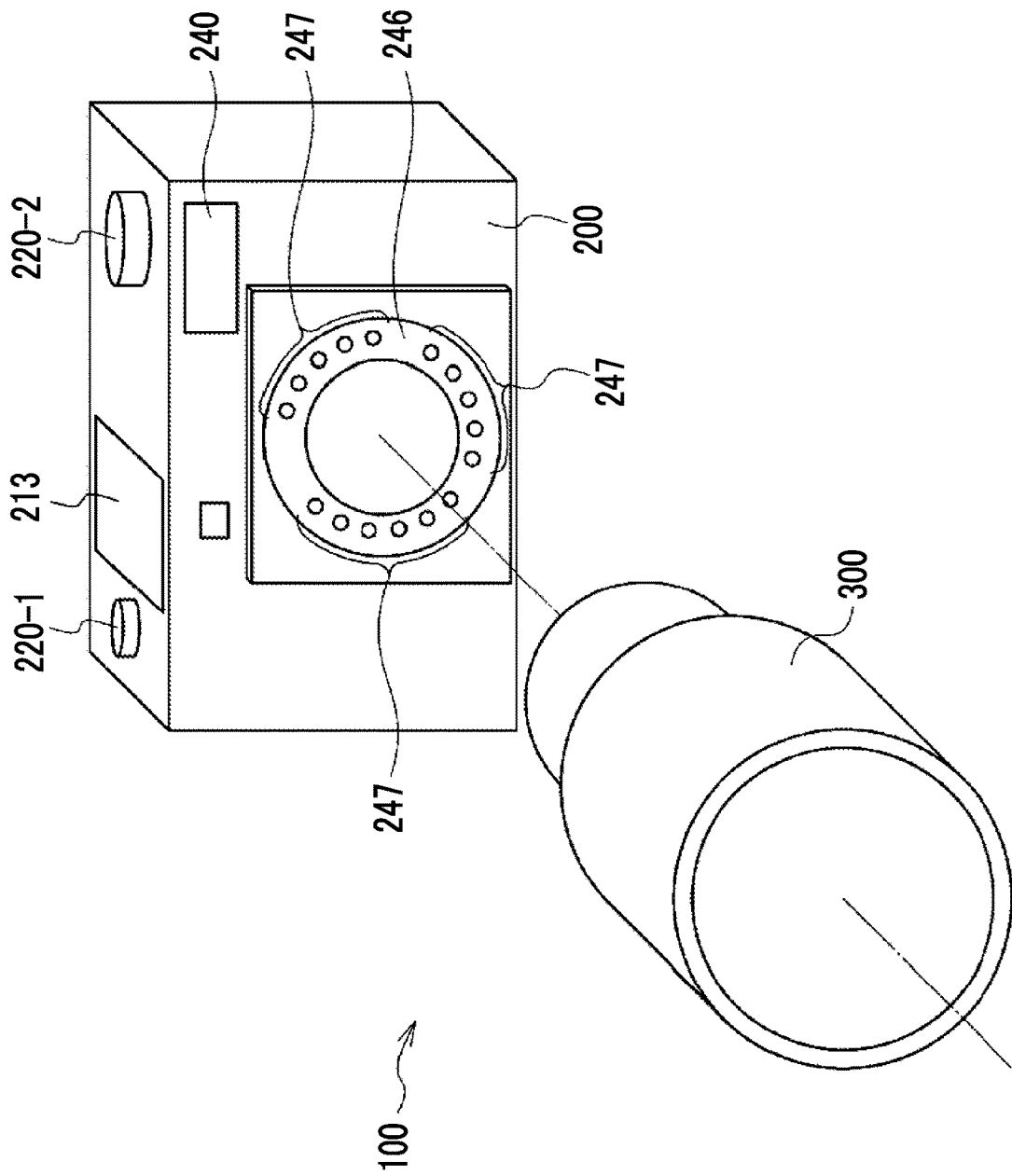
FIG. 1 is a diagram showing a configuration of an imaging apparatus according to a first embodiment of the present invention.
Figure 2:
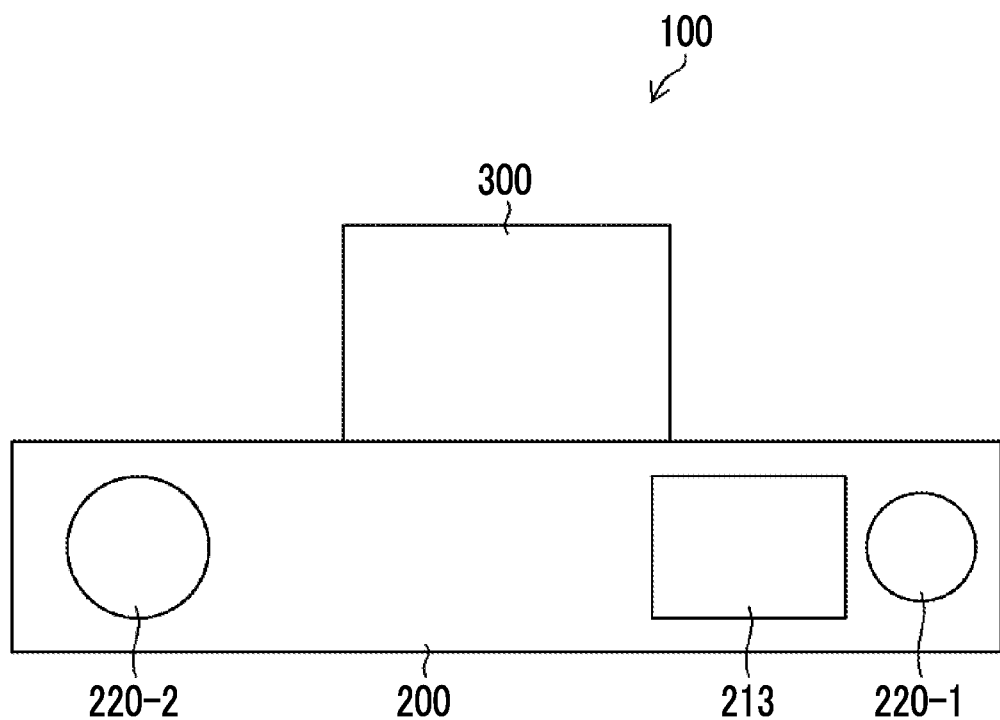
FIG. 2 is a top view of the imaging apparatus.

FIG. 1 is a perspective view showing an external appearance of an imaging apparatus 100 (the electronic apparatus and the electronic apparatus main body) according to a first embodiment of the present invention. The imaging apparatus 100 includes an imaging apparatus main body 200 (electronic apparatus main body), and a lens device 300 (electronic apparatus main body) attached to the imaging apparatus main body 200. The imaging apparatus main body 200 and the lens device 300 are attached to each other by connecting a mount 246 provided at the imaging apparatus main body 200 and a mount 346 (see FIG. 3) of the lens device 300 corresponding to the mount 246, and is detached from each other by disconnecting these mounts thereof. A flash 240 is provided on a front surface of the imaging apparatus main body 200 in addition to the mount 246, and a release button 220-1, a dial 220-2 for setting an imaging mode, and a top monitor 213 (liquid crystal display device) are provided on a top surface (see FIG. 2).

Figure 3:
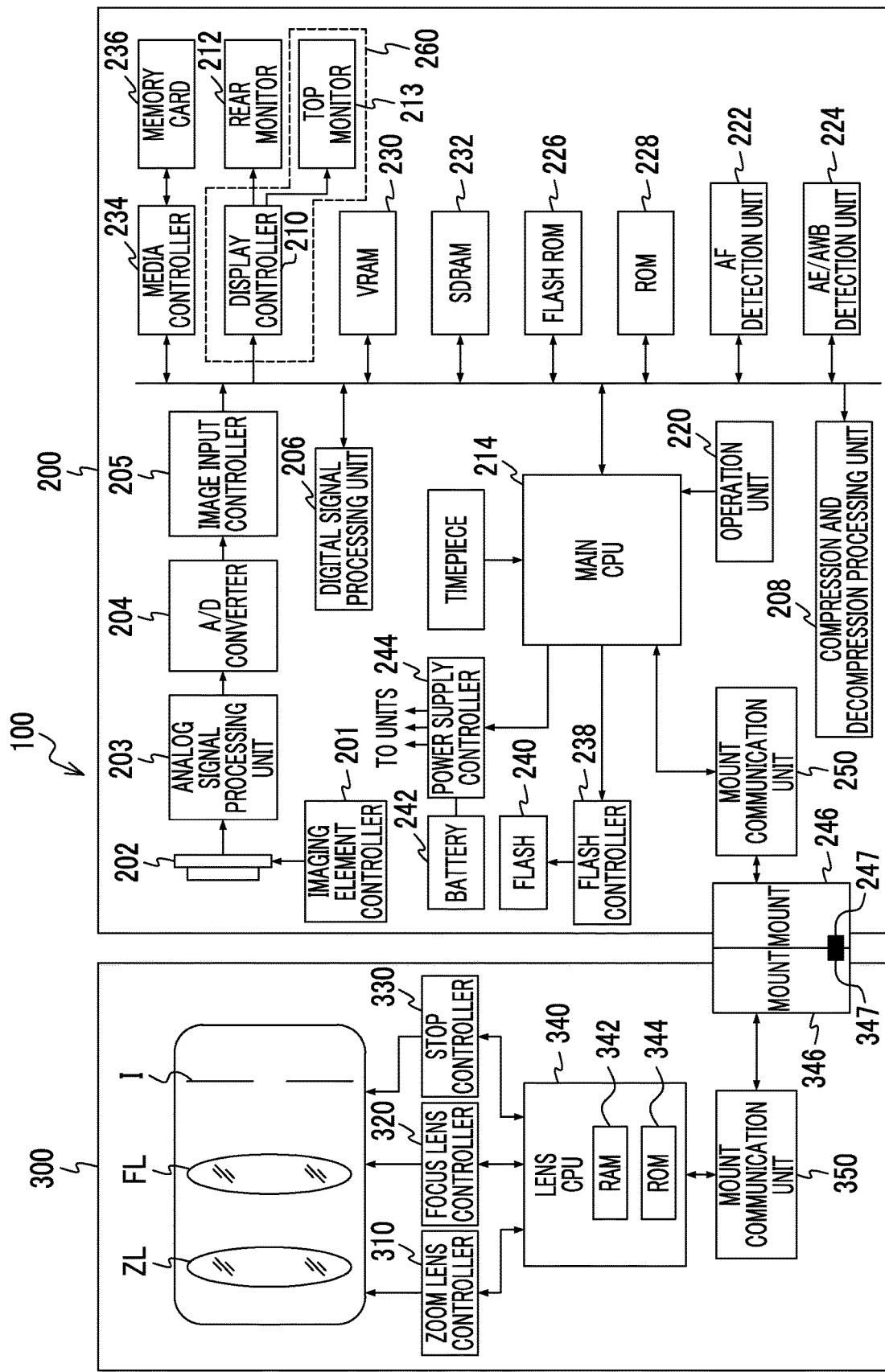
FIG. 3 is a block diagram showing the configuration of the imaging apparatus.

FIG. 3 is a block diagram showing a configuration of the imaging apparatus 100. Operations of the imaging apparatus 100 is generally controlled by a main CPU 214 (CPU: Central Processing Unit) of the imaging apparatus main body 200 and a lens CPU 340 of the lens device 300. A program and data required for the operations of the main CPU 214 are stored in a flash ROM 226 and a ROM 228 (ROM: Read Only Memory) within the imaging apparatus main body 200, and a display control program (a display control program causing a liquid crystal display device 260 to perform a display control method) according to the present invention is recorded in the ROM 228, as a code readable by the computer (the main CPU 214 and a display controller 210). Accordingly, the ROM 228 is an example of the non-transitory recording medium according to the present invention, and recording media such as a hard disk, a magneto-optical recording device such as a digital versatile disk (DVD), or various semiconductor memories can be used as the non-transitory recording medium according to the present invention. A program and data required for operations of the lens CPU 340 are stored in a ROM 344 within the lens CPU 340.

An operation unit 220 including a playback button, a MENU/OK key, a cross key, and a BACK key in addition to the release button 220-1 and the dial 220-2 is provided at the imaging apparatus main body 200. A user can issue commands such as selection of the imaging mode or a playback mode, imaging start, selection of an image, playback, deletion, and a zoom command in by operating the buttons and/or the keys included in the operation unit 220. The user can switch between an illumination mode in which backlight is illuminated and a non-illumination mode in which backlight is not illuminated by operating the buttons and/or the keys. A signal from the operation unit 220 is input to the main CPU 214. The main CPU 214 controls circuits of the imaging apparatus main body 200 based on the input signal, and transmits and receives signals to and from the lens device 300 through the mount 246 and a mount communication unit 250.

A terminal 247 is provided at the mount 246, and a terminal 347 is provided at the mount 346. In a case where the lens device 300 is attached to the imaging apparatus main body 200, the corresponding terminals 247 and 347 come in contact with each other, and thus, communication can be performed (the terminals 247 and 347 in FIGS. 1 and 3 are conceptually depicted, and the positions and numbers of the terminals in the imaging apparatus 100 are not limited to these diagrams).

Examples of the aforementioned terminals include a ground terminal, a synchronization signal terminal, a serial communication terminal, a control status communication terminal, and a power supply terminal for the units of the lens device 300 from a battery 242 of the imaging apparatus main body 200. Power supply from the battery 242 is performed under the control of a power supply controller 244.

In the imaging mode, subject light is formed on a light reception surface of an imaging element 202 of the imaging apparatus main body 200 through a zoom lens ZL, a focus lens FL, and a stop I of the lens device 300. Although it has been described in the first embodiment that the imaging element 202 is a complementary metal-oxide semiconductor (CMOS) type, the imaging element is not limited to the CMOS type. A charge coupled device (CCD) type may be used. The focus lens FL, the zoom lens ZL, and the stop I are driven by a zoom lens controller 310, a focus lens controller 320, and a stop controller 330 which are controlled by the lens CPU 340, and focus control, zoom control, and stop control are performed.

The zoom lens controller 310 changes an imaging magnification by moving the zoom lens ZL in an optical axis direction according to a command from the lens CPU 340. The focus lens controller 320 focuses on a subject by causing the focus lens FL to move back and forth in the optical axis direction according to a command from the lens CPU 340. The stop controller 330 changes an F number of the stop I according to a command from the lens CPU 340.

In a case where a first-step push operation of the release button 220-1 (an operation to push the button halfway through a stroke; also referred to as a "half push operation") is performed, the main CPU 214 starts auto focus (AF) and auto exposure (AE) operations, and image data output from an A/D converter 204 (A/D: Analog to Digital) is input to an AE/AWB detection unit 224 (AE: Automatic Exposure, AWB: Automatic White Balance) in response to the pushing. The main CPU 214 calculates brightness (imaging Ev value, Ev: Exposure Value) of the subject from an accumulation value of G signals (signals of pixels in which green color filters are arranged) input to the AE/AWB detection unit 224, and controls the F number of the stop I, a charge accumulation time (corresponding to a shutter speed) in the imaging element 202, and an emission time of the flash 240 based on the result thereof.

An AF detection unit 222 is a part that performs contrast AF processing or phase difference AF processing. In a case where the contrast AF processing is performed, the focus lens FL within a lens barrel is controlled such that an AF evaluation value indicating a focusing state is a maximum value which is calculated by integrating high-frequency components of the image data within a focus region. In a case where the phase difference AF processing is performed, the focus lens FL within the lens device 300 is controlled such that a defocus amount obtained from phase difference data calculated by using pixels having a plurality of phase differences within the focus region of the image data is zero.

In a case where the AE operation and the AF operation are finished and a second-step push operation of the release button 220-1 (a full stroke push operation; also referred to as a "fully push operation") is performed, the flash 240 is emitted through the control using a flash controller 238. Based on a readout signal applied from an imaging element controller 201, signal charges accumulated in the imaging element 202 are read as voltage signals corresponding to the signal charges, and are applied to an analog signal processing unit 203. The analog signal processing unit 203 samples, holds, and amplifies R signals, G signals, and B signals of pixels by performing correlative double sampling processing on the voltage signals output from the imaging element 202, and applies the sampled, held, and amplified signals to the A/D converter 204. The A/D converter 204 converts analog R signals, G signals, and B signals (signals of pixels in which red, green, and blue color filters are arranged) sequentially input into digital R signals, G signals, and B signals, and outputs the converted signals to an image input controller 205. In a case where the imaging element 202 is the metal oxide semiconductor (MOS) type imaging element, the A/D converter 204 is built in the imaging element 202 in many cases, and the aforementioned correlative double sampling processing is not required.

The image data output from the image input controller 205 is input to a digital signal processing unit 206, and signal processing such as offset processing, gain control processing including white balance correction and sensitivity correction, gamma-correction processing, and YC processing (processing of brightness signals and color difference signals) is performed on the input image data. The image data is written and/or read out to a VRAM 230 (Video RAM), and is encoded by the display controller 210. The image data is output to a rear monitor 212, and thus, a subject image is displayed on the rear monitor 212.

In response to the full push operation of the release button 220-1, the image data output from the A/D converter 204 is input to and is temporarily stored in an SDRAM 232 (SDRAM: Synchronous Dynamic Random Access Memory) from the image input controller 205. After the image data is temporarily stored in the SDRAM 232, an image file is generated by performing the signal processing such as the gain control processing, the gamma-correction processing, and the YC processing in the digital signal processing unit 206 and compression processing in a compression and decompression processing unit 208 in a Joint Photographic Experts Group (JPEG) format on the image data. The image file is read by a media controller 234, and is recorded in a memory card 236. The image recorded in the memory card 236 can be played on displayed by the rear monitor 212 by operating the playback button of the operation unit 220. Meanwhile, the top monitor 213 displays information such as an operation state and an imaging condition of the imaging apparatus 100 under the control of the display controller 210 (liquid crystal display device, display controller). The display controller 210 and the top monitor 213 constitutes a liquid crystal display device 260 (liquid crystal display device) according to the first embodiment.

<Configuration of Top Monitor>

Figure 4:
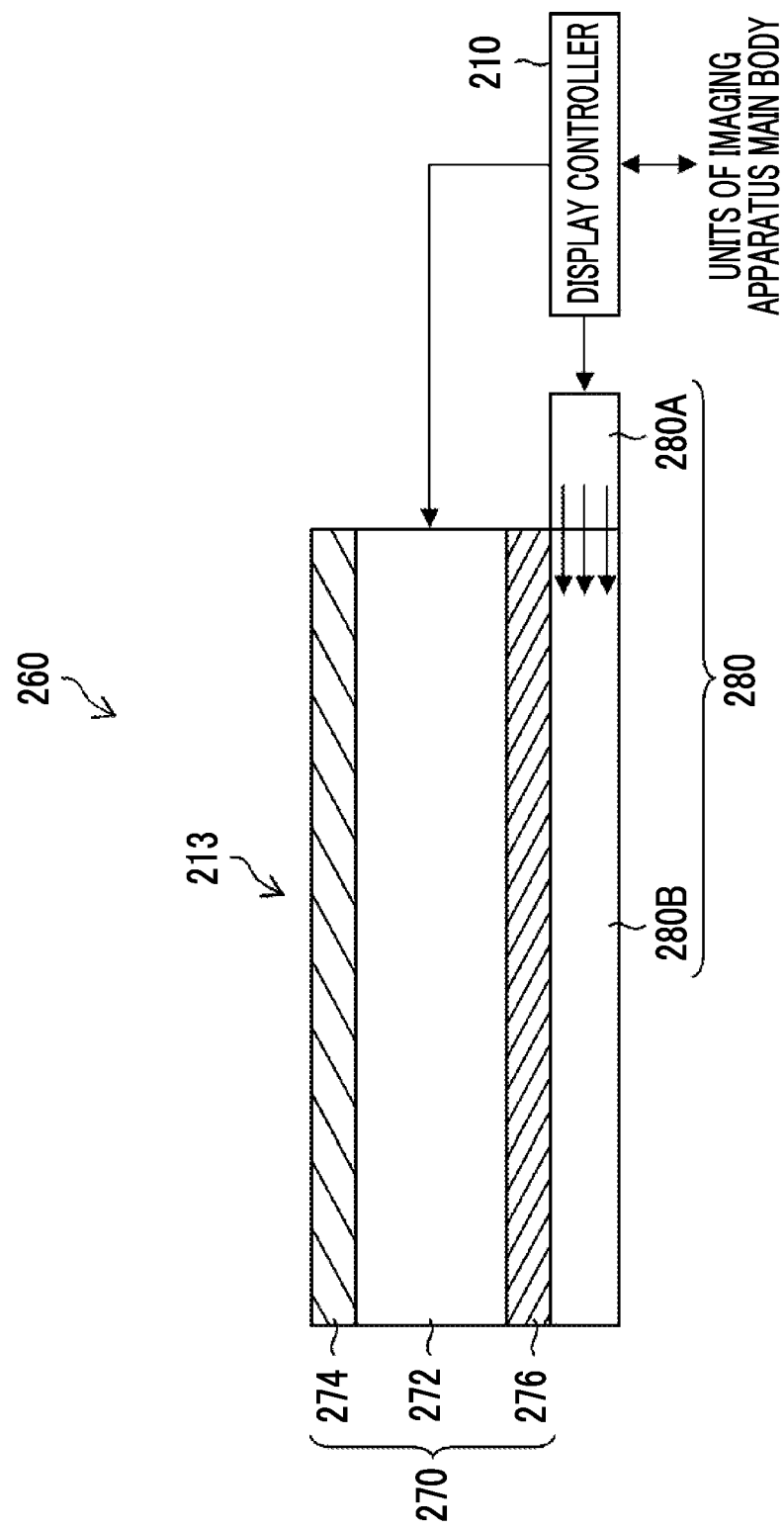
FIG. 4 is a diagram showing a configuration of a liquid crystal display device.

FIG. 4 is a diagram showing a schematic configuration of the top monitor 213. The top monitor 213 comprises a liquid crystal cell 272, a transmission-side polarizing plate 274 (polarizing plate), a reflection-side polarizing plate 276 (polarizing plate), and a backlight unit 280 (backlight unit). The liquid crystal cell 272, the transmission-side polarizing plate 274, and the reflection-side polarizing plate 276 are constituent elements of a liquid crystal display panel 270 (liquid crystal display panel) according to the first embodiment. The liquid crystal cell 272 uses a TN type liquid crystal (TN: Twisted Nematic), independently sets a shielding region and a transmission region for each dot by applying or not applying a voltage to each dot by using an electrode (not shown), and displays the aforementioned information (the details of display control will be described below). The transmission-side polarizing plate 274 provided on a front side (viewing side) of the liquid crystal cell 272 has a wavelength compensation function, and the reflection-side polarizing plate 276 provided on a rear side (side opposite to the viewing side) does not have the wavelength compensation function. External incidence ray is reflected by the reflection-side polarizing plate 276. The backlight unit 280 comprises a white LED 280A (white LED) as a light source of backlight, and a light guide plate 280B which guides the backlight (including light rays of two or more wavelength ranges) illuminated from the white LED 280A to the liquid crystal display panel 270, and is set in the illumination mode in which the backlight is illuminated or the non-illumination mode in which the backlight is not illuminated under the control of the display controller 210 (the switching between the illumination and the non-illumination of the backlight can be performed by the display controller 210 based on a command input by the user through the operation unit 220). That is, the liquid crystal display panel 270 is a semi-transmission type liquid crystal display panel capable of using both the reflection of ambient light and the backlight as light sources. The liquid crystal display panel 270 can be a so-called normal white type liquid crystal display panel, but the present invention can also be applied to a normal black type liquid crystal display panel.

<Hardware Structure of Display Controller>

In the first embodiment, various processors to be described below can be adopted as a hardware structure for realizing various processing (first display control and second display control in a display control step, and switching control between the illumination and the non-illumination of the backlight) in the display controller 210. As the various processors, there are a central processing unit (CPU) which is a general-purpose processor which performs various processing by software (program), a programmable logic device (PLD) which is a processor capable of changing a circuit configuration after Field Programmable Gate Array (FPGA) is manufactured, and a dedicated electric circuitry which is a processor having a circuit configuration designed as a dedicated circuit in order to perform specific processing such as an Application Specific Integrated Circuit (ASIC).

A function of the display controller 210 may be realized by one of the various processors, or may be realized by the same kind or different kinds of two or more processors (for example, a plurality of FPGAs, or a combination of the CPU and the FPGA). A plurality of functions may be realized by one processor. As the example in which the plurality of functions is realized by one processor, there is a first aspect in which one processor is constituted by a combination of one or more CPUs and software as represented by a computer such as a client or a server, and the processor realizes the plurality of functions. There is a second aspect in which a processor that realizes the functions of the entire system including the plurality of functions by one integrated circuit (IC) chip as represented by a system on chip (SoC) is used. As stated above, the various functions are realized by using one or more of the various processors as the hardware structure. More specifically, the hardware structure of the various processors is an electric circuitry in which circuit elements such as semiconductor elements are combined.

In the display controller 210, the processor or the electric circuitry having such a configuration performs various processing (the step of the display control method) while referring the program (display control program) and the data stored in the flash ROM 226 and the ROM 228. The VRAM 230 and/or the SDRAM 232 are used as a temporary storage area or a work area at the time of the processing as needed.

<Processing of Display Control>

Figure 5:
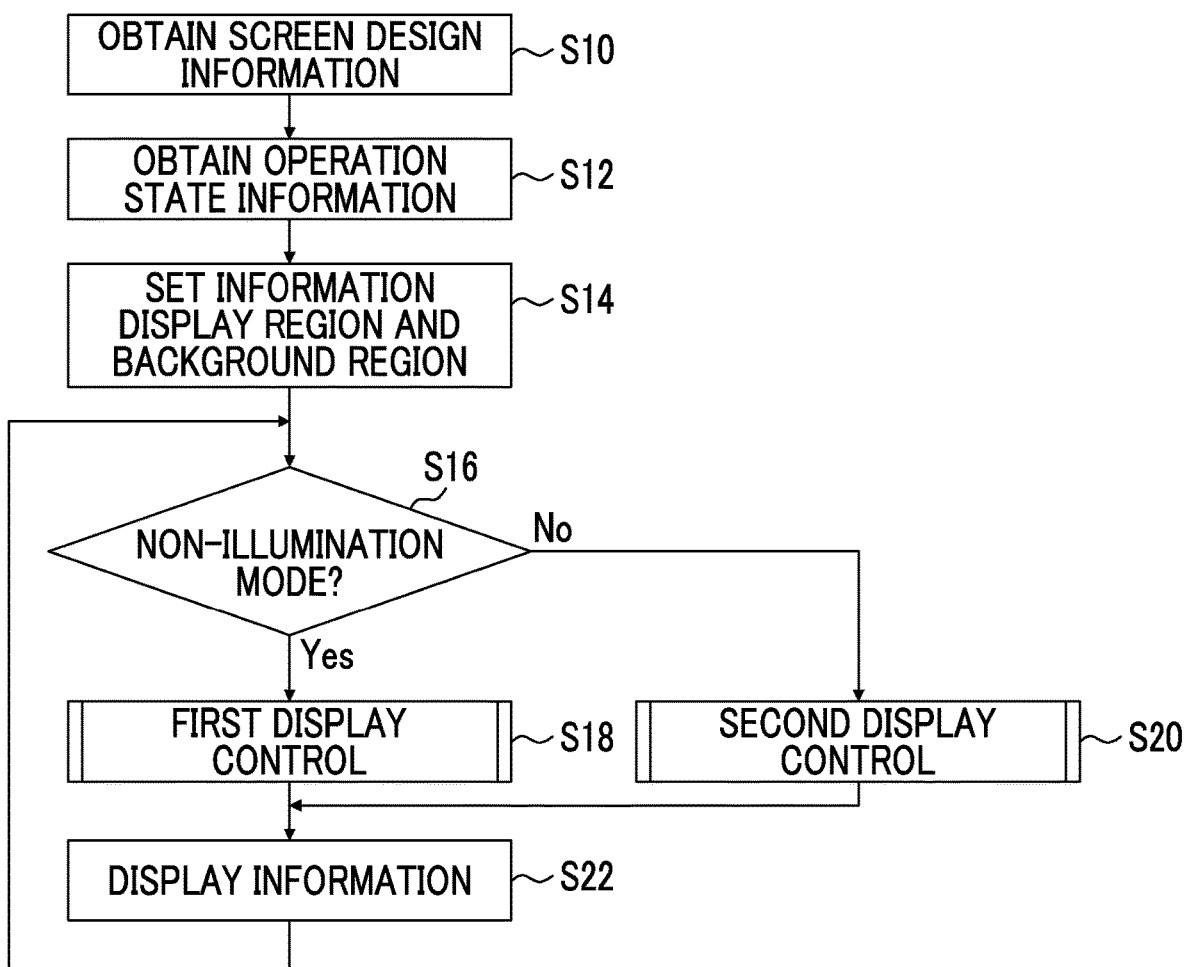
FIG. 5 is a flowchart showing processing of display control according to the first embodiment.
Figure 8:
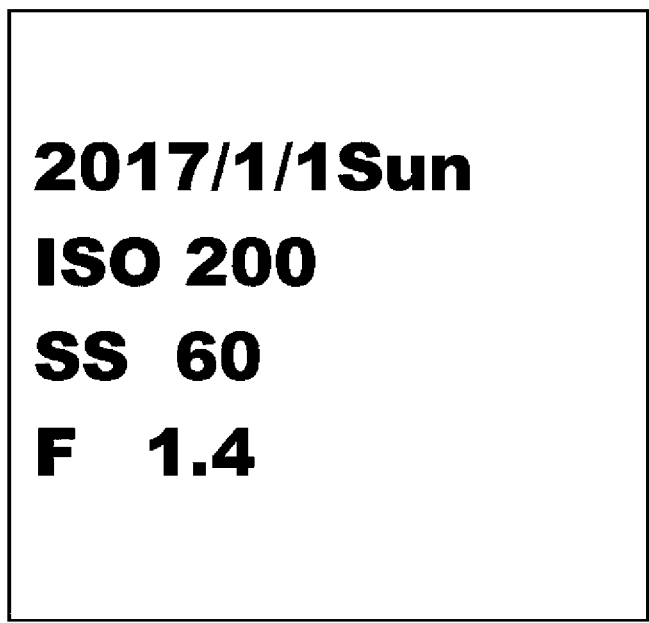
FIG. 8 is a diagram showing an example of information displayed on the liquid crystal display device.

Next, display control in the imaging apparatus 100 having the aforementioned configuration will be described. FIG. 5 is a flowchart showing processing (display control method) of the display control. In the following example, it is assumed that a date and an imaging condition shown in FIG. 8 is displayed on the top monitor 213, as operation state information indicating an operation state of the imaging apparatus 100 (imaging apparatus main body 200 and the lens device 300). Specifically, a date is 2017/1/1Sun (Sunday, Jan. 1, 2017), ISO sensitivity (ISO: International organization for Standardization) is 200, a shutter speed SS is 1/60 seconds, and an F number F is 1.4.

In a case where the processing of the display control is started, screen design information (for example, the numbers, positions, shapes, and arrangement of information display regions and background regions, and whether to black display on a white background or white display on a black background) is obtained in step S10. The screen design information may be obtained by being reads out from the flash ROM 226 and/or the ROM 228 by the display controller 210, or may be obtained by the display controller 210 in response to a command input of the user through the operation unit 220. Here, it is assumed that a display pattern (whether or not the transmission region is arranged using the shielding region as a base and vice versa) is also not changed without dividing a display region into the date and the operation state information. In a case where the screen design information is obtained, the display controller 210 obtains the operation state information from each unit of the imaging apparatus 100 in step S12. The operation state information is information indicating the operation state of the imaging apparatus 100 (the imaging apparatus main body 200 and the lens device 300), and the aforementioned imaging condition is obtained as the operation state information in the first embodiment. In a case where the screen design and the operation state information are obtained, the position, numbers, and arrangement of information display regions and background regions are set based on the screen design and the operation state information (step S14). It is assumed that the "white" in the following description means a color of the liquid crystal display panel 270 in a state in which the backlight and/or the external incidence ray reflected by the reflection-side polarizing plate 276 is transmitted and the "black" means a color of the liquid crystal display panel 270 in a state in which the light is shielded.

In step S16, it is determined whether or not the backlight unit is in the non-illumination mode (whether the backlight is illustrated or is not illustrated). For example, this determination can be performed by the display controller 210 based on a command input by the user through the operation unit 220. In a case where the determination result is positive (in a case of the non-illumination mode), the processing proceeds to step S18, and the first display control is performed. In a case where the determination result is negative (the case of the illumination mode), the processing proceeds to step S20, and the second display control is performed. The information (the aforementioned date and imaging condition) is displayed depending on the result of the first or second display control (step S22; display control step).

Figure 6:
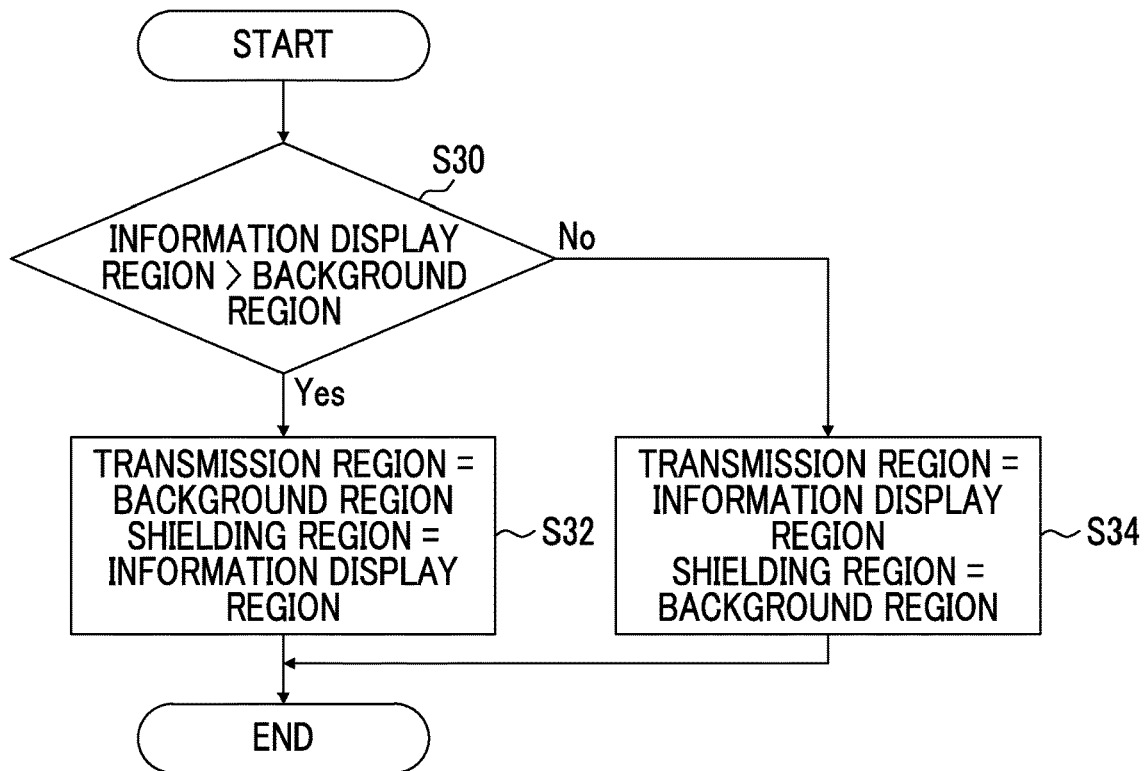
FIG. 6 is a flowchart showing processing of first display control.

FIG. 6 is a flowchart showing processing of the first display control (the display control in the non-illumination mode; display control step). In the first display control, it is determined which region of the information display region and the background region has a larger area (whether or an area of the information display region is larger than an area of the background region) (step S30). In a case where the determination result is positive, the processing proceeds to step S32. The information display region of which the area is larger is set as the shielding region, and the background region of which the area is smaller is set as the transmission region (the black display on the white background). Meanwhile, in a case where the determination result in step S30 is negative, the processing proceeds to step S34. The information display region of which the area is smaller is set as the transmission region, and the background region of which the area is larger is set as the shielding region (the white display on the black background).

Figure 7:
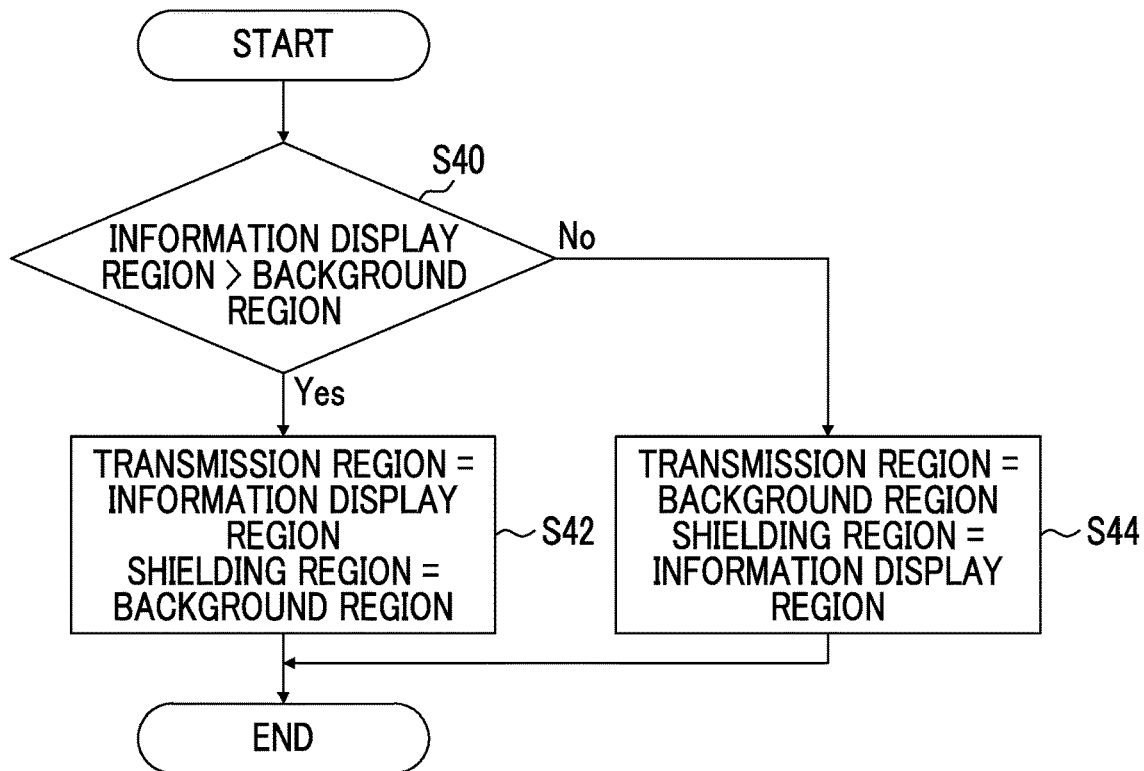
FIG. 7 is a flowchart showing processing of second display control.

Meanwhile, FIG. 7 is a flowchart showing processing of the second display control (the display control in the illumination mode; display control step). In the second display control, it is determined which region of the information display region and the background region has a larger area (whether or not the area of the information display region is larger than the area of the background region) (step S40). In a case where the determination result is positive, the processing proceeds to step S42. The information display region of which the area is larger is set as the transmission region, and the background region of which the area is smaller is set as the shielding region (the white display on the black background). Meanwhile, in a case where the determination result in step S40 is negative, the processing proceeds to step S44. The information display region of which the area is smaller is set as the shielding region, and the background region of which the area is larger is set as the transmission region (the black display on the white background).

Figure 9A:
FIG. 9A and FIG. 9B are diagrams showing display scenes during non-illumination of backlight and during illumination of the backlight.
Figure 9B:
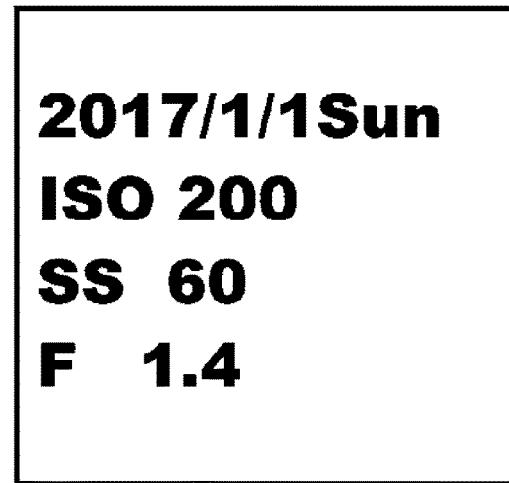
Figure 10A:
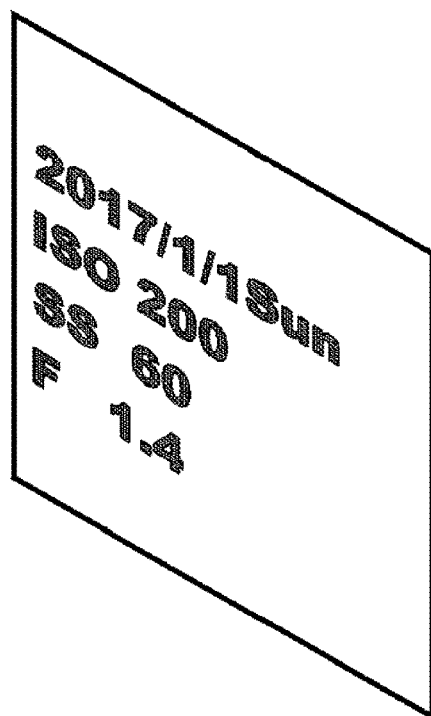
FIG. 10A and FIG. 10B are diagrams showing scenes of a tint change depending on a viewing direction.
Figure 10B:
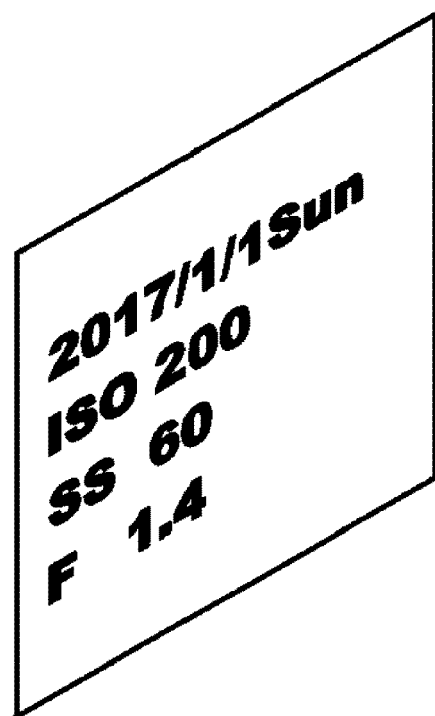

In the example of FIG. 8, the area of the information display region is smaller than the area of the background region. Thus, in the non-illumination mode, the background region of which the area is larger is set as the shielding region (a black display portion in FIG. 9A) and the information display region of which the area is smaller is set as the transmission region (a white display portion in FIG. 9A) through the first display control (see FIG. 6). Meanwhile, in the illumination mode, the background region of which the area is larger is set as the transmission region (a white display portion in FIG. 9B) and the information display region of which the area is smaller is set as the shielding region (a black display portion in FIG. 9B) through the second display control (see FIG. 7) (steps S40 and S44). Through such display control, a tint change caused by an angle (viewing direction) in the illumination mode is as shown in FIG. 10A and FIG. 10B (FIG. 10A is a state viewed in a lower left direction and FIG. 10B is a state viewed in a lower right direction; a difference in tint is represented by a difference in hatched portion). Although there is the tint change depending on the viewing direction in the illumination mode, the information display region (character portion) of which the area is smaller is set as the shielding region through the aforementioned second display control and thus, white light is transmitted through the background region of which the area is larger. Accordingly, a change in tint is not remarkable in the aforementioned second display control. It is possible to obtain such an effect with a simple configuration without using an additional optical member.

In the aforementioned first and second display control, the information display region may be set as the shielding region, and the background region may be set as the transmission region. Conversely, the information display region may be set as the transmission region, and the background region may be set as the shielding region.

Figure 11A:
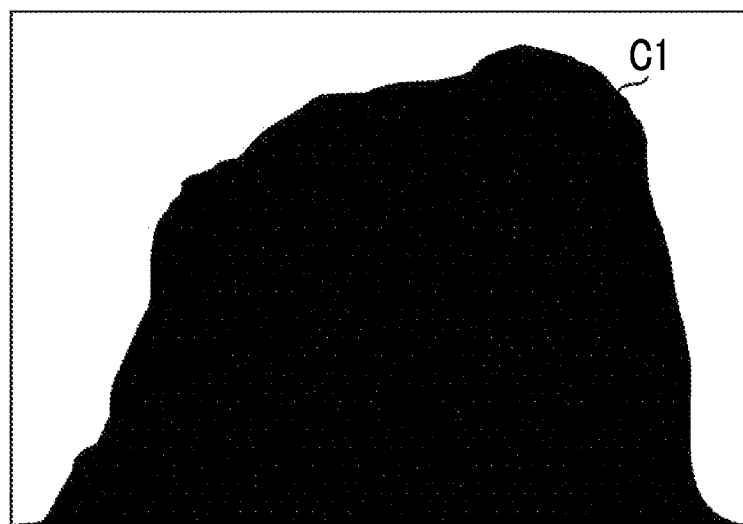
FIG. 11A and FIG. 11B are other diagrams showing the display scenes during the non-illumination of the backlight and during the illumination of the backlight.
Figure 11B:
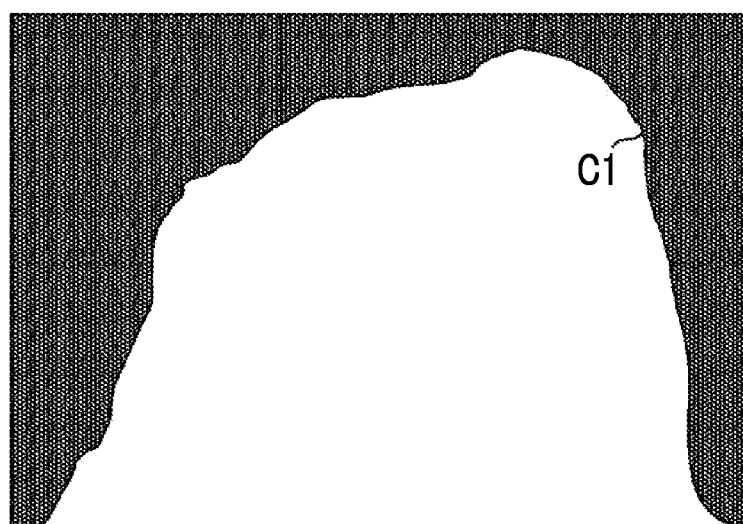

The information such as the operation state information may not be displayed by characters and numbers as shown in FIGS. 9A, 9B, 10A and 10B, and may be displayed by figures, symbols, or graphs. FIG. 11A and FIG. 11B are diagrams showing an example of a histogram of a captured image. A horizontal axis represents brightness of the captured image, and a vertical axis represents the number of pixels. In the example of FIG. 11A and FIG. 11B, the area of the information display region (a lower side of a curve C1 representing the histogram) is larger than the areas of the background region (an upper side of the curve C1). Thus, in the non-illumination mode, the information display region of which the area is larger is set as the shielding region and the background region of which the area is smaller is set as the transmission region through the first display control (FIG. 11A; the black display on the white background). Meanwhile, contrary to the non-illumination mode, in the illumination mode, the information display region of which the area is larger is set as the transmission region, and the background region of which the area is smaller is set as the shielding region (FIG. 11B; the white display on the black background). Similarly to the example described in FIGS. 8, 9A, 9B, 10A and 10B, the tint change depending on the viewing direction in the illumination mode (FIG. 11B) is caused depending on the display control. However, the change in tint is not remarkable since the background region of which the area is smaller is set as the shielding region by the forementioned first and second display control.

<Example of Display Control in Region of Interest>

Figure 12:
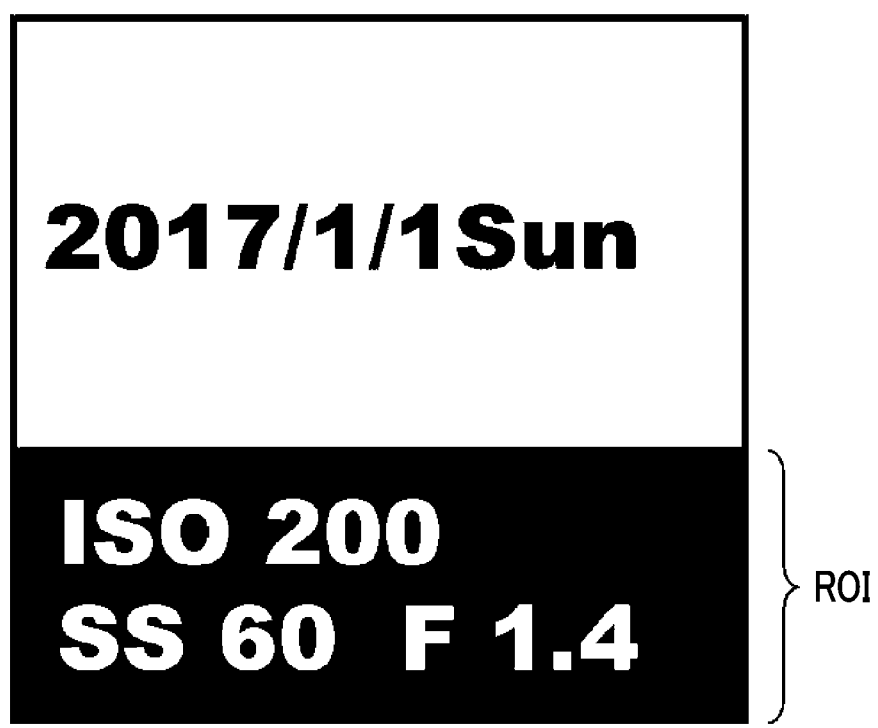
FIG. 12 is a diagram showing a scene in which a region of interest is set.

Although it has been described in the example of FIGS. 8 to 10 that the display pattern is also not changed without dividing the display region into the date and the imaging condition (operation state information), the display pattern may be changed by dividing the display region into the date and the imaging condition. For example, as shown in FIG. 12, a region of interest (ROI) in which the imaging condition as the operation state information is displayed is provided in a part of the display region, and the date (the information other than the operation state information) is displayed in a region other than the region of interest ROI. The display pattern (for example, whether the information display region or the background region is set as the transmission region or the shielding region, that is, whether to perform the white display on the black background or the black display on the white background) is changed by dividing the display region into the region of interest ROI and the other region. For example, during the non-illumination of the backlight, in the region of interest, a character portion (information display region) is displayed as the transmission region, and a background portion (background region) is displayed as the shielding region (the white display on the black background). In the region other than the region of interest, the character portion is displayed as the shielding region, and the background portion is displayed as the transmission region (the black display on the white background). As stated above, the display pattern is changed by dividing the display region into the region of interest and the other region, and thus, it is possible to easily view the information (imaging condition) in which the content is changed during imaging and for which the attention of the user is high.

Figure 13B:
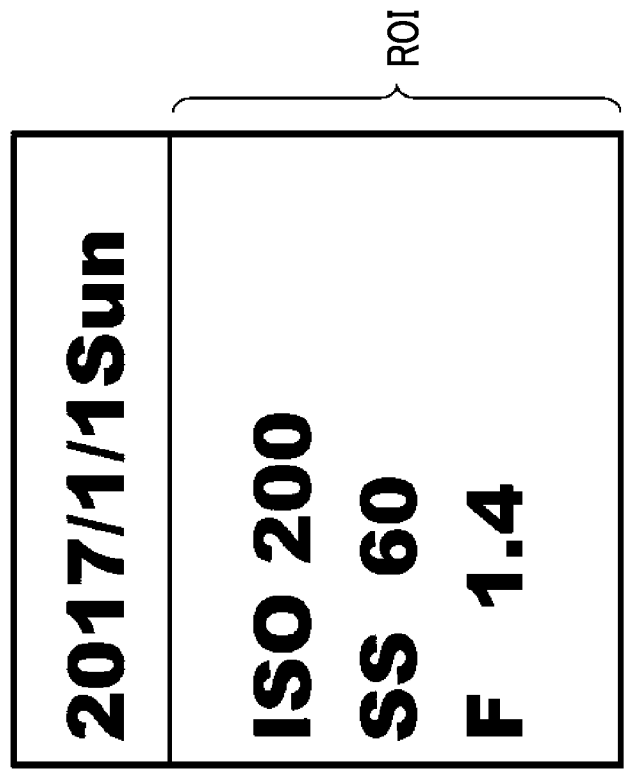
FIG. 13A and FIG. 13B are diagrams showing scenes of display control in an aspect in which the region of interest is set.
Figure 13A:
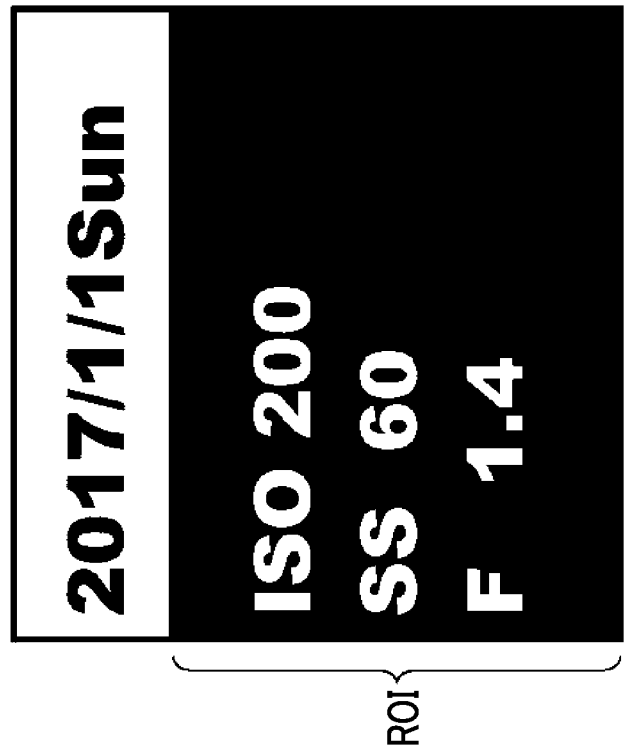
Figure 14A:
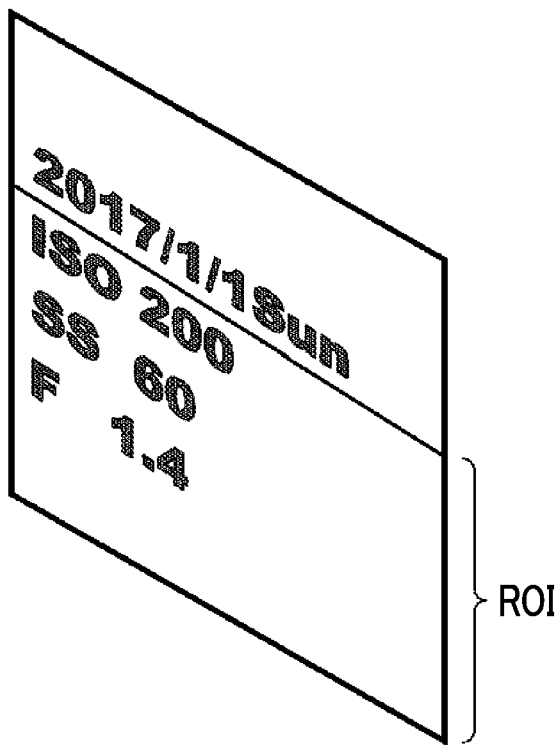
FIG. 14A and FIG. 14B are diagrams showing scenes of the tint change depending on the viewing direction.
Figure 14B:
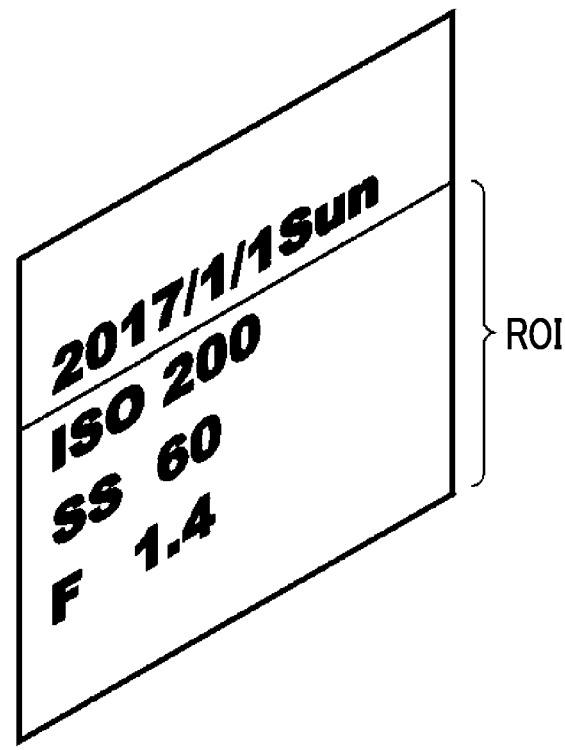

In a case where the aforementioned region of interest is provided, it is possible to perform the first and second display control depending on the ratio of the information display region to the region of interest. For example, in FIG. 13A, and FIG. 13B, since the area of the background region (black portion) is larger than the area of the information display region (in which the imaging condition as the operation state information is displayed; white portion) in the region of interest ROI, the first and second display control are performed in the region of interest ROI. Specifically, during the non-illumination of the backlight, the first display control is performed in the region of interest ROI, and the display control is in a display state shown in FIG. 13A. During the illumination of the backlight, the second display control is performed, and the display control is in a display state shown in FIG. 13B. Accordingly, scenes of the tint change depending on the viewing direction during the illumination of the backlight are as shown in FIG. 14A and FIG. 14B (FIG. 14A is a state viewed in the lower left direction and FIG. 14B is a state viewed in the lower right direction; a difference in tint is represented by a difference in hatched portion), and thus, it is possible to make the tint changes depending on the viewing direction unremarkable.

<Setting of Threshold Value Depending on Allowable Value of Tint Change>

In the imaging apparatus 100 having the aforementioned configuration, a threshold value may be set with consideration for an allowable value of the tint change and the display control may be performed based on the set threshold value as in the following example.

Figure 15:
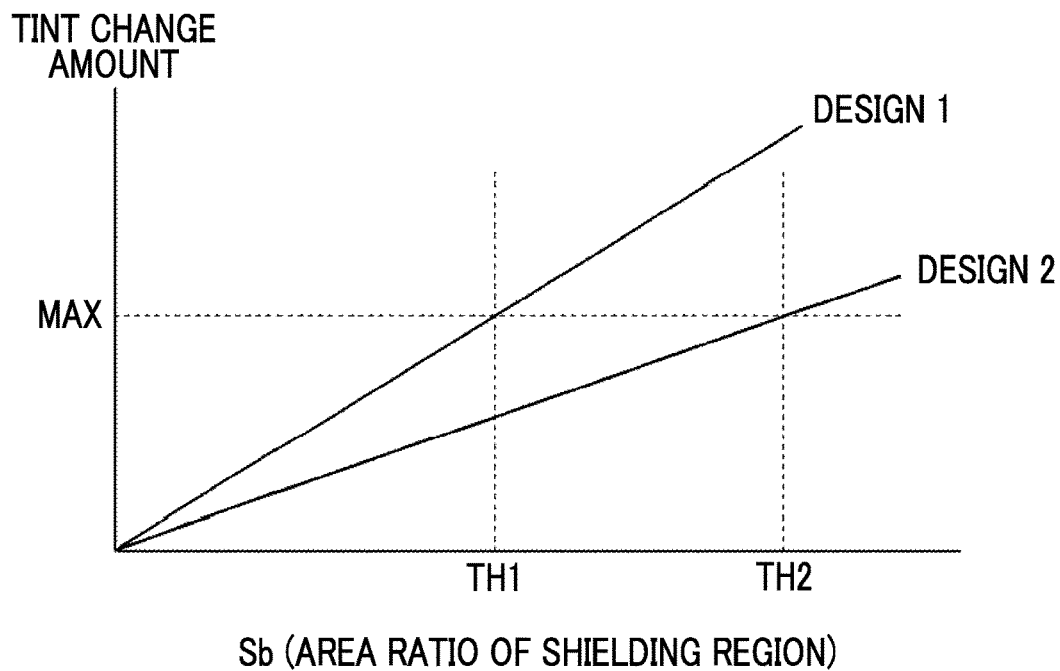
FIG. 15 is a diagram showing a relationship between an area ratio of a shielding region and a tint change amount.

FIG. 15 is a conceptual diagram showing a relationship between an area ratio Sb of the shielding region and the tint change amount during the illumination of the backlight. The "area ratio Sb of the shielding region" in FIG. 15 can be associated with the "ratio of the area at which the information display region occupies" as the "ratio of the area of the larger one of the information display region and the background region to the area of the entire display region (or the region of interest) during the illumination of the backlight". For example, the tint change amount can be obtained by quantifying a percentage of persons who feel that "tint is changed" in sensory evaluation for a specific number of persons, and an area ratio at which the tint change amount exceeds an allowable value MAX can be set as a threshold value for the shielding region.

In a case where the threshold value is set, it is determined which one of the information display region and the background region is set as the shielding region or which one is set as the transmission region such that the ratio of the shielding region does not exceed the set threshold value (third display control). For example, in a case where the ratio of the area of the larger one of the information display region and the background region is larger than the threshold value, the region of which the area is larger is set as the transmission region, and the region of which the area is smaller is set as the shielding region (third display control). In a case where the ratio of the area of the larger one thereof is equal to or smaller than the threshold value, any region thereof may be set as the shielding region. For example, the region of which the area is larger can be set as the transmission region, and the region of which the area is smaller can be set as the shielding region. In this case, the transmission region and the shielding region may be set such that the screen design (the pattern of the white and black display) during the non-illumination of the backlight is maintained.

The allowable value and the threshold value may be different in a plurality of screen designs (for example, a plurality of screen designs in which at least one of the number, positions, or shapes of information display regions is different). For example, in FIG. 15, a threshold value TH1 is used in a design 1, and a threshold value TH2 is used in a design 2 (it is assumed that the allowable values MAX of the tint changes are equal to each other in the designs 1 and 2). Since an area region in which the user has an interest is not the entire display region in some cases, the threshold value may be set for a part of the display region like the aforementioned region of interest. The threshold value may be set in response to a command input by the user (direct input or selection) through the operation unit 220. The screen designs in association with the threshold values may be stored in the flash ROM 226, the ROM 228, and the display controller 210, and the threshold value may be set depending on the screen design.

<Display Control with Consideration for Hysteresis>

Since the information such as the operation state information is changed during the use of the imaging apparatus 100, the ratio of the area at which the shielding region occupies may be larger than or smaller than the threshold value. In such a situation, the display may be switched whenever the relationship (whether the ratio is larger or smaller than the threshold value) between the ratio and the threshold value is changed. However, the display pattern is frequently changed depending on the use situations (the kind of the information to be displayed or the setting of the imaging condition) of the imaging apparatus 100, and thus, there is a possibility that it will be difficult to view the display. Thus, it is possible to perform the display control with consideration for the hysteresis (history) of the ratio of the area at which the shielding region occupies as will be described below.

Figure 16:
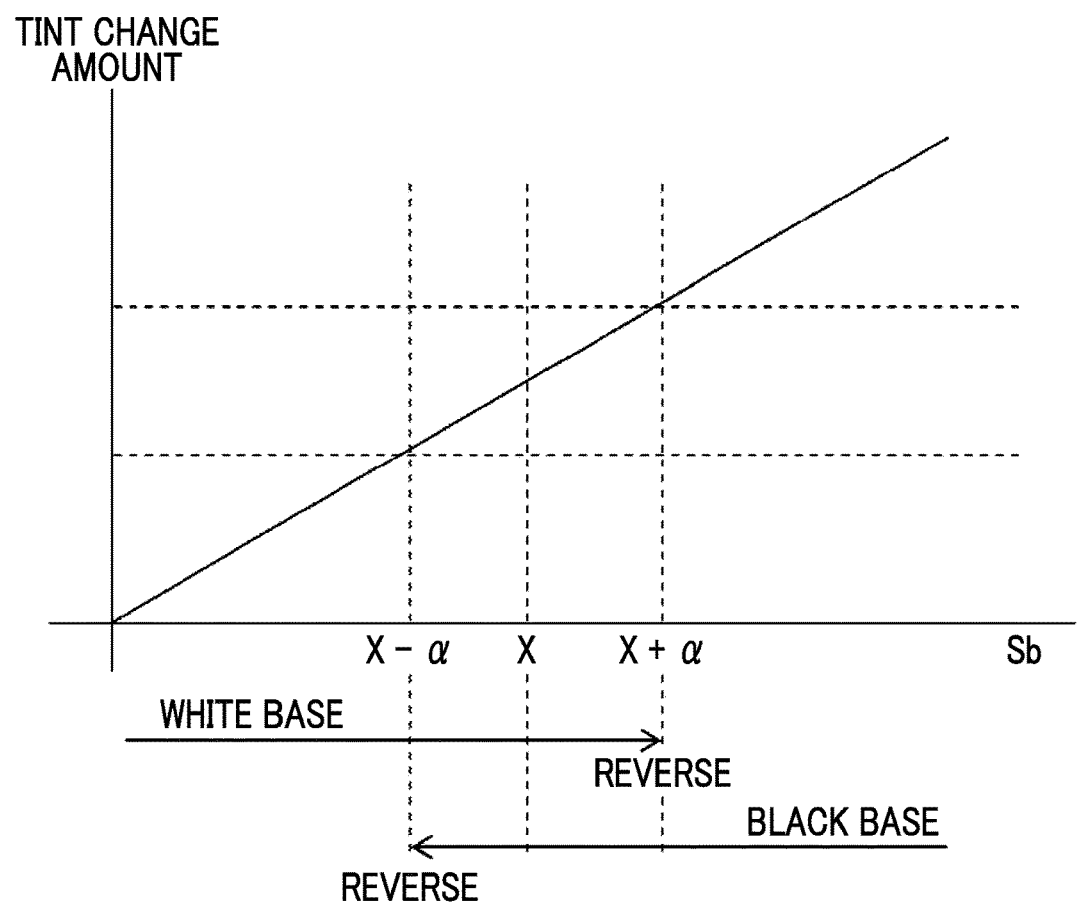
FIG. 16 is a diagram for describing display control with consideration for hysteresis.

In examples shown in FIGS. 16 and 17, an upper limit value $(X+\alpha)$ and a lower limit value $(X-\alpha)$ are set as a threshold value X of the area ratio Sb. In a case where the area ratio Sb becomes large (for example, monotonically increases) from a state $(Sb<(X-\alpha))$ in which the area ratio is smaller than the lower limit value $(X-\alpha)$ and exceeds the upper limit value $(X+\alpha)$ $(Sb>(X+\alpha))$ in the illumination mode, the display is reversed (from the black display on the white background to the white display on the black background; fourth display control). In FIG. 17, changes at timings t1 and t3 correspond to such a case. Similarly, in a case where the area ratio Sb becomes small (for example, monotonically decreases) from a state $(Sb>(X+\alpha))$ in which the area ratio is larger than the upper limit value $(X+\alpha)$ and is smaller than the lower limit value (X−α) (Sb<(X−α)), the display is reversed (from the white display on the black background to the black display on the white background; fifth display control). In the example of FIG. 17, a change at a timing t2 corresponds to such a case. In a case where these conditions are not satisfied (for example, changes at timings t4 and t5), the display is not switched even though the relationship between the area ratio Sb and the threshold value is changed. Through such display control, it is possible to perform easy-to-see display by suppressing a frequent change of the display pattern while making the tint change depending on the viewing direction unremarkable.

<Another Aspect of Present Invention>

In addition to the aforementioned first to ninth aspects, tenth to sixteenth aspects to be described below are also included in the present invention. In the tenth to sixteenth aspects, it is assumed that the same descriptions as those in the first to ninth aspects mean the same configurations.

<Tenth Aspect>

A liquid crystal display device according to a tenth aspect comprises a semi-transmission type liquid crystal display panel using TN type liquid crystals, a backlight unit that is set in an illumination mode in which backlight including light rays of two or more wavelength ranges is illuminated or a non-illumination mode in which the backlight is not illuminated, and a display controller that displays information on the liquid crystal display panel by setting, as an information display region, one of a shielding region which shields the backlight and an external incidence ray and a transmission region which transmits the backlight and the external incidence ray and setting the other one as a background region. The display controller performs first display control in which a region having a larger area of the information display region and the background region is set as the shielding region and a region having a smaller area is set as the transmission region in the non-illumination mode, and performs third display control in which the region having the larger area is set as the transmission region and the region having the smaller area is set as the shielding region in a case where a ratio of the area at which the larger one of the information display region and the background region occupies the total display region of the liquid crystal display panel is larger than a threshold value in the illumination mode.

<Eleventh Aspect>

An eleventh aspect is different from the tenth aspect in that a display controller sets a different threshold value for each of a plurality of display aspects in which at least one of the number, positions, or shapes of information display regions on a liquid crystal display panel is different.

<Twelfth Aspect>

A twelfth aspect is an electronic apparatus comprising an electronic apparatus main body and the liquid crystal display device according to the tenth or eleventh aspect. The liquid crystal display device displays, as information, operation state information indicating an operation state of the electronic apparatus main body.

<Thirteenth Aspect>

A thirteenth aspect is different from the twelfth aspect in that a display controller performs first display control and third display control in a region of interest which is set for a part of a display region of a liquid crystal display panel and in which operation state information indicating an operation state is displayed.

<Fourteenth Aspect>

A display control method according to a fourteenth aspect is a display control method of a liquid crystal display device comprising a semi-transmission type liquid crystal display panel using a TN type liquid crystal and a backlight unit that is set in an illumination mode in which backlight including light rays of two or more wavelength ranges is illuminated or a non-illumination mode in which the backlight is not illuminated. The display control method includes a display controller that displays information on the liquid crystal display panel by setting, as an information display region, one of a shielding region which shields the backlight and an external incidence ray and a transmission region which transmits the backlight and the external incidence ray and setting the other one as a background region. In the display control step, first display control in which a region having a larger area of the information display region and the background region is set as the shielding region and a region having a smaller area is set as the transmission region is performed in the non-illumination mode, and third display control in which the region having the larger area is set as the transmission region and the region having the smaller area is set as the shielding region in a case where a ratio of the area at which the larger one of the information display region and the background region occupies the total display region of the liquid crystal display panel is larger than a threshold value is performed in the illumination mode.

<Fifteenth and Sixteenth Aspects>

A display control program according to a fifteenth aspect causes a liquid crystal display device to perform the display control method according to the fourteenth aspect. A non-transitory recording medium according to a sixteenth aspect is a non-transitory recording medium recording a computer-readable code of the display control program according to the fifteenth aspect.

While the aspects of the present invention have been described, the present invention is not limited to the aforementioned aspects, and can be variously modified without departing from the gist of the present invention. For example, although it has been described in the aforementioned imaging apparatus 100 that the white LED 280A is used as the light source of the backlight, the present invention is not limited to the white LED, and can be applied to a light source which illuminates light rays of two or more wavelength ranges (for example, a red wavelength range and a blue wavelength range). In such a light source, transmission characteristics are different depending on a wavelength even at the same angle (viewing direction), and thus, the tint seems to be changed. However, it is possible to make the tint change unremarkable by performing the display control according to the present invention.

EXPLANATION OF REFERENCES

100: imaging apparatus
200: imaging apparatus main body
201: imaging element controller
202: imaging element
203: analog signal processing unit
204: A/D converter
205: image input controller
206: digital signal processing unit
208: compression and decompression unit
210: display controller
212: rear monitor
213: top monitor
214: main CPU
220: operation unit
220-1: release button
220-2: dial 222: AF detection unit
224: AE/AWB detection unit
226: flash ROM
228: ROM
230: VRAM
232: SDRAM
234: media controller
236: memory card
238: flash controller
240: flash
242: battery
244: power supply controller
246: mount
247: terminal
250: mount communication unit
260: liquid crystal display device
270: liquid crystal display panel
272: liquid crystal cell
274: transmission-side polarizing plate
276: reflection-side polarizing plate
280: backlight unit
280A: white LED
280B: light guide plate
300: lens device
310: zoom lens controller
320: focus lens controller
330: stop controller
340: lens CPU
344: ROM
346: mount
347: terminal
F: F number
FL: focus lens
I: stop
MAX: allowable value
ROI: region of interest
S10 to S44: steps of display control method
Sb: area ratio
SS: shutter speed
X: threshold value
ZL: zoom lens

What is claimed is:

1. An electronic apparatus comprising:
a liquid crystal display panel that has a different transmission wavelength characteristics depending on a viewing direction and uses a backlight and reflection of an external incidence ray as light sources;
a backlight unit that is set in an illumination mode in which the backlight including light rays of two or more wavelength ranges is illuminated or a non-illumination mode in which the backlight is not illuminated; and
a display controller that displays information on the liquid crystal display panel by setting one of a shielding region which shields the backlight and the external incidence ray and a transmission region which transmits the backlight and the external incidence ray as an information display region and setting the other one as a background region,
wherein the display controller performs first display control in which a region having a larger area of the information display region and the background region is set as the shielding region and a region having a smaller area is set as the transmission region, and performs second display control in which the region having the larger area of the information display region and the background region is set as the transmission region and the region having the smaller area is set as the shielding region,
wherein the information to be displayed is limited to characters, numbers, symbols, and figures,
wherein the information is displayed in binary tone, and
wherein the display controller independently sets the shielding region and the transmission region by controlling each dot of the liquid crystal display panel.

2. The electronic apparatus according to claim 1,
wherein the display controller determines which of the information display region and the background region is larger, and performs the first display control and the second display control based on a result of the determination.

3. The electronic apparatus according to claim 1,
wherein the liquid crystal display panel uses a TN type liquid crystal.

4. The electronic apparatus according to claim 1,
wherein the backlight unit uses LED as a light source of the backlight.

5. The electronic apparatus according to claim 1,
wherein the display controller controls a white LED as a light source of the backlight.

6. The electronic apparatus according to claim 1,
wherein the display controller controls LED having outputs of two different wavelength ranges.

7. The electronic apparatus according to claim 1,
wherein the display controller displays operation state information indicating an operation state of the electronic apparatus on the liquid crystal display panel.

8. The electronic apparatus according to claim 1, wherein the light source in a region where transmitted light of the backlight is not used is the external incidence ray.

9. The electronic apparatus according to claim 1, wherein the backlight is uniformly illuminated.

10. The electronic apparatus according to claim 1, wherein the binary tone is black and white tone.

11. An imaging apparatus comprising:
a display monitor on which a subject image is displayed;
a liquid crystal display panel that has different transmission wavelength characteristics depending on a viewing direction and uses a backlight and reflection of an external incidence ray as light sources;
a backlight unit that is set in an illumination mode in which the backlight including light rays of two or more wavelength ranges is illuminated or a non-illumination mode in which the backlight is not illuminated; and
a display controller that displays information on the liquid crystal display panel by setting one of a shielding region which shields the backlight and the external incidence ray and a transmission region which transmits the backlight and the external incidence ray as an information display region and setting the other one as a background region,
wherein the display controller performs first display control in which a region having a larger area of the information display region and the background region is set as the shielding region and a region having a smaller area is set as the transmission region, and performs second display control in which the region having the larger area of the information display region and the background region is set as the transmission region and the region having the smaller area is set as the shielding region, wherein the information to be displayed is limited to characters, numbers, symbols, and figures in the liquid crystal display, wherein the information is displayed in binary tone in the liquid crystal display, and wherein the display controller independently sets the shielding region and the transmission region by controlling each dot of the liquid crystal display panel.

12. The imaging apparatus according to claim 11, wherein the display controller determines which of the information display region and the background region is larger, and performs the first display control and the second display control based on a result of the determination.

13. The imaging apparatus according to claim 11:

wherein the display monitor is arranged on a first surface of the imaging apparatus and the liquid crystal display panel is arranged on a second surface which is a surface arranged on a side that a dial and/or a release button is arranged on the imaging apparatus.

14. The imaging apparatus according to claim 13:

wherein the first surface is a rear surface of the imaging apparatus and the second surface is a top surface of the imaging apparatus.

15. The imaging apparatus according to claim 11, wherein the liquid crystal display panel uses a TN type liquid crystal.

16. The imaging apparatus according to claim 11, wherein the binary tone is black and white tone.

17. A display control method of an electronic apparatus comprising a liquid crystal display panel that has a different transmission wavelength characteristics depending on a viewing direction and uses a backlight and reflection of an external incidence ray as light sources, and a backlight unit that is set in an illumination mode in which the backlight including light rays of two or more wavelength ranges is illuminated or a non-illumination mode in which the backlight is not illuminated, the method comprising:

a display control step of displaying information on the liquid crystal display panel by setting one of a shielding region which shields the backlight and the external incidence ray and a transmission region which transmits the backlight and the external incidence ray as an information display region and setting the other one as a background region, wherein the display control step performs first display control in which a region having a larger area of the information display region and the background region is set as the shielding region and a region having a smaller area is set as the transmission region, and performs second display control in which the region having the larger area of the information display region and the background region is set as the transmission region and the region having the smaller area is set as the shielding region, wherein the information to be displayed is limited to characters, numbers, symbols, and figures, wherein the information is displayed in binary tone, and wherein the display controller independently sets the shielding region and the transmission region by controlling each dot of the liquid crystal display panel.

18. The display control method according to claim 17, wherein, in the display control step, which of the information display region and the background region is larger is determined, and the first display control and the second display control are performed based on a result of the determination.

19. The display control method according to claim 17, wherein the liquid crystal display panel uses a TN type liquid crystal.

20. A non-transitory computer readable medium for storing a display control program causing the electronic apparatus to perform the display control method according to claim 17.

21. The display control method according to claim 17, wherein the binary tone is black and white tone.

\* \* \* \* \*